(12) United States Patent
Huang

(10) Patent No.: US 6,467,816 B1
(45) Date of Patent: Oct. 22, 2002

(54) WATER PIPE JOINT

(76) Inventor: Huang-Fu Huang, No. 515, Chang-Nan Rd., Fen-Yuan Hsiang, Chang-Hua Hsien (TW)

( * ) Notice: Subject to any disclaimer, the term of this patent is extended or adjusted under 35 U.S.C. 154(b) by 0 days.

(21) Appl. No.: 09/933,445

(22) Filed: Aug. 21, 2001

(51) Int. Cl.[7] ................................................. F16L 37/18
(52) U.S. Cl. ........................ 285/316; 285/308; 285/309
(58) Field of Search .......................... 285/35, 308, 309, 285/315, 316

(56) References Cited

U.S. PATENT DOCUMENTS

| | | | | |
|---|---|---|---|---|
| 3,873,062 A | * | 3/1975 | Johnson et al. ............. | 285/317 |
| 4,660,803 A | * | 4/1987 | Johnston et al. ........ | 137/533.17 |
| 4,903,942 A | * | 2/1990 | Licciardello et al. ....... | 285/315 |
| 5,209,528 A | * | 5/1993 | Weh et al. .................. | 285/315 |
| 5,884,943 A | * | 3/1999 | Katzer et al. ............... | 285/316 |
| 5,927,683 A | * | 7/1999 | Weh et al. ................... | 285/316 |
| 6,199,913 B1 | * | 3/2001 | Wang ......................... | 285/315 |
| 6,283,443 B1 | * | 9/2001 | Taneya ....................... | 285/316 |

* cited by examiner

Primary Examiner—Eric K. Nicholson
Assistant Examiner—Aaron Dunwoody
(74) Attorney, Agent, or Firm—Harrison & Egbert

(57) ABSTRACT

A water pipe joint includes a main body, a control sleeve, and an elastic element. The main body is provided with a plurality of expansion holes and receiving slots. The elastic element is disposed in a receiving gap of the main body. The control sleeve is provided with a plurality of retaining blocks and resilient pieces. The control sleeve is joined with the main body such that the retaining blocks of the control sleeve are slidably received in the receiving slots of the main body, and such that the retaining blocks of the control sleeve are acted on by the elastic element and the resilient piece to extend out of the expansion holes of the main body, so as to be detachably engaged with a water discharging connector.

1 Claim, 7 Drawing Sheets

WATER PIPE JOINT

BACKGROUND OF THE INVENTION

1. Field of the Invention

The present invention relates generally to a water pipe, and more particularly to a water pipe joint.

2. Description of Related Art

As shown in FIG. 1, a water pipe joint of the prior art comprises a hollow main body 10 which is provided at one end with a hose connector 101 and a locking nut 2. The main body 10 is provided at other end with a spring 17 fitted thereover, walls 11, and an expansion hole 12. Located between two walls 11 is a guide slot 110 for receiving a driven piece 13 which is provided with a retaining block 130. The retaining block 130 is extracted and retracted via the expansion hole 12. The driven piece 13 is pushed by a driving piece 15. The main body 10 is provided with a protruded edge 103 for stopping a stop piece 16 of a control sleeve 14. The spring 17 is forced backward by the control sleeve 14, so as to enable the retaining block 130 to retract into the expansion hole 12. As a result, the water discharging connector 1 can be inserted into a through hole 102 of the main body 10. As the control sleeve 14 is let go, the driven piece 13 is forced by the driving piece 15, thereby causing the retaining block 130 to jut out of the expansion hole 12. The main body 10 is thus joined with the water discharging connection 1 which can be connected with a hose or sprinkler.

Such a prior art water pipe joint as described above has several drawbacks. In the first place, it is rather complicated in construction and is therefore not cost-effective. In addition, the prior art water pipe joint is vulnerable to failure or clogging. In view of the fact that the control sleeve 14 and the main body 10 cannot be separated easily once they are joined together, the prior art water pipe-joint cannot be repaired or maintained with ease. Moreover, the control sleeve 14 and the retaining block 130 are made separately by injection molding, thereby resulting in a substantial increase in production cost.

BRIEF SUMMARY OF THE INVENTION

The primary objective of the present invention is to provide a water pipe joint which is free of the drawbacks of the prior art water pipe described above.

The features, functions, and advantages of the present invention will be more readily understood upon a thoughtful deliberation of the following detailed description of the preferred embodiment of the present invention with reference to the accompanying drawings.

DETAILED DESCRIPTION OF THE INVENTION

Figure 1:
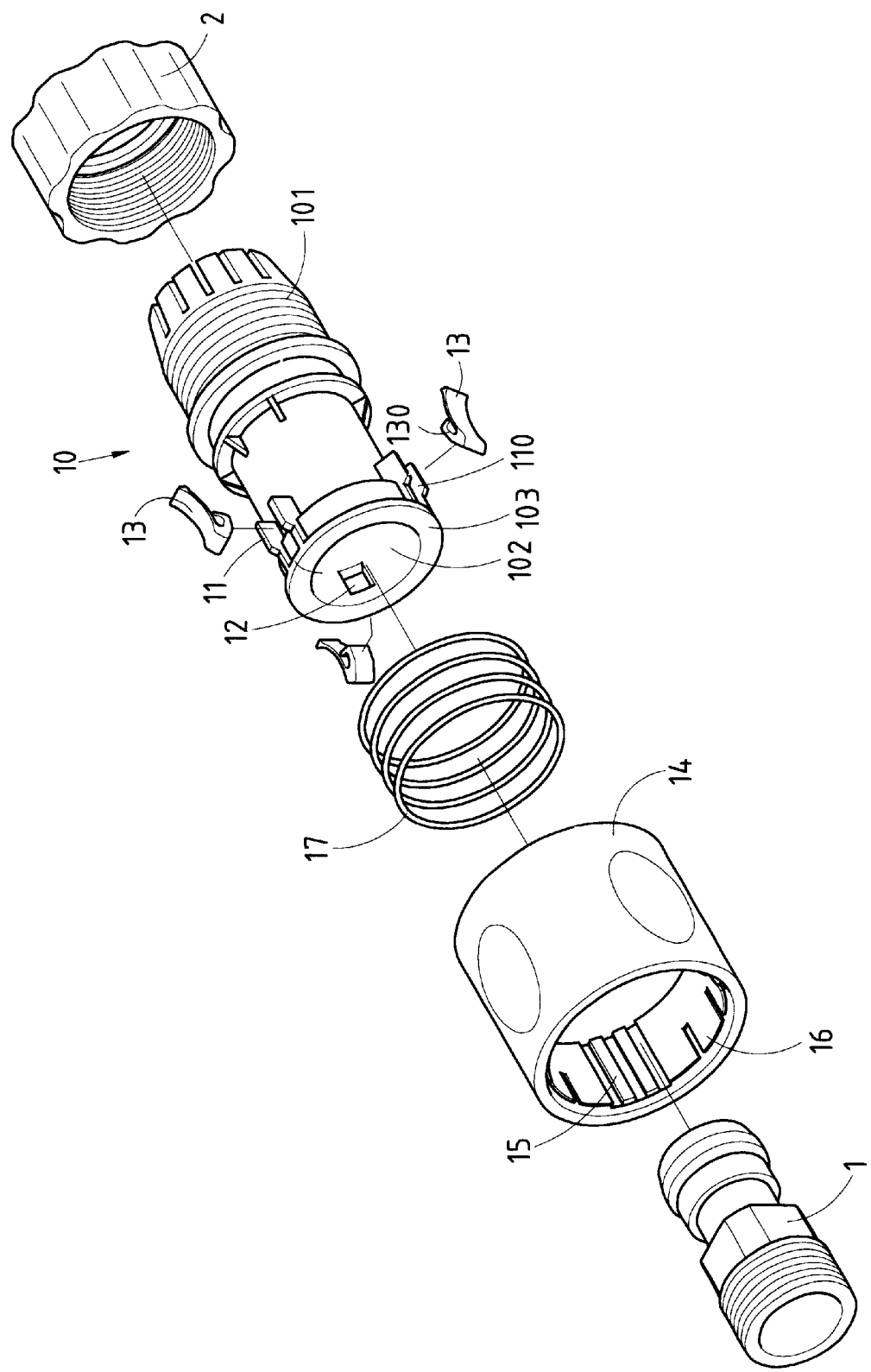
FIG. 1 shows an exploded view of a water pipe joint of the prior art.
Figure 2:
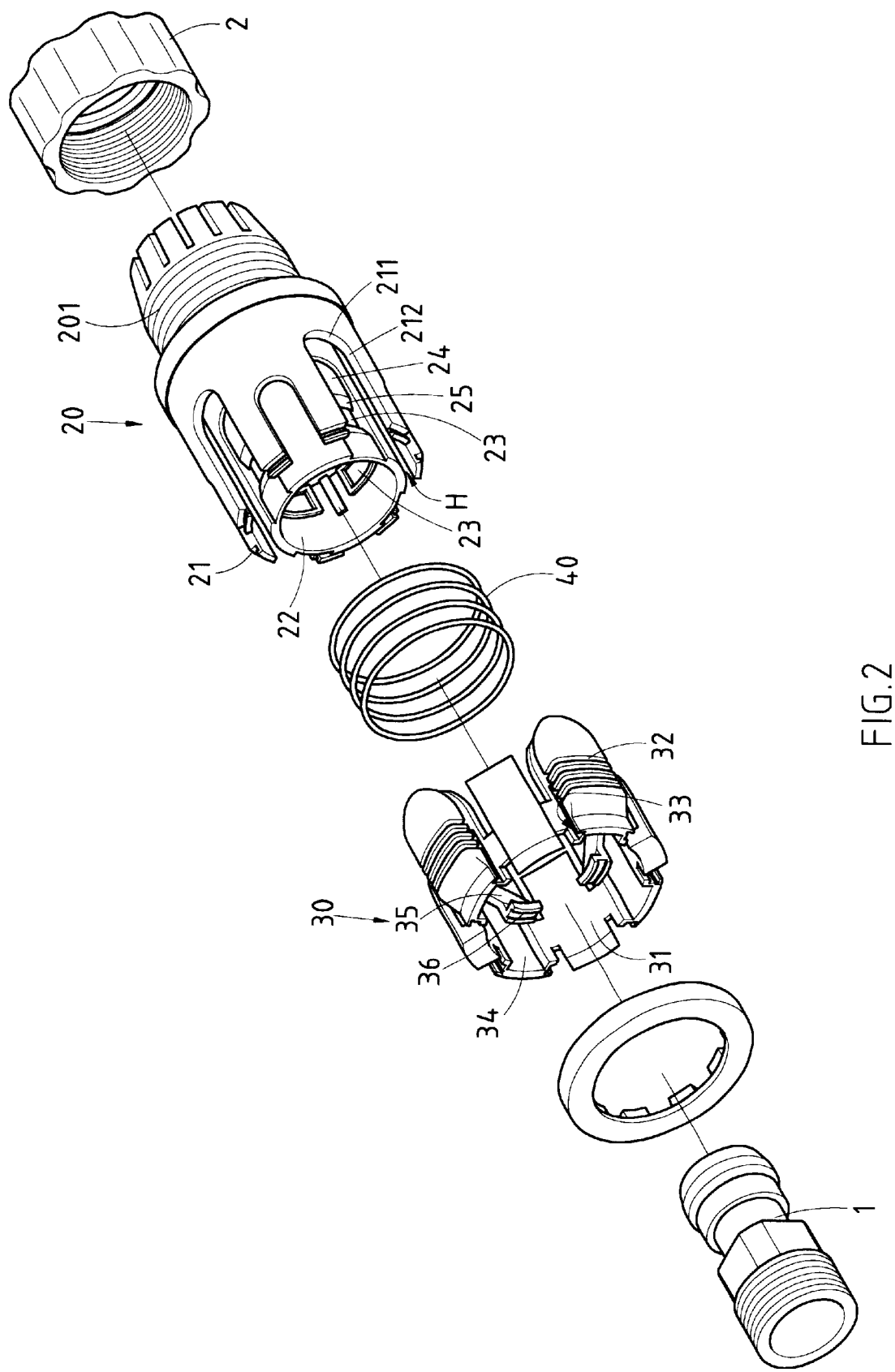
FIG. 2 shows an exploded view of a first preferred embodiment of the present invention.
Figure 3:
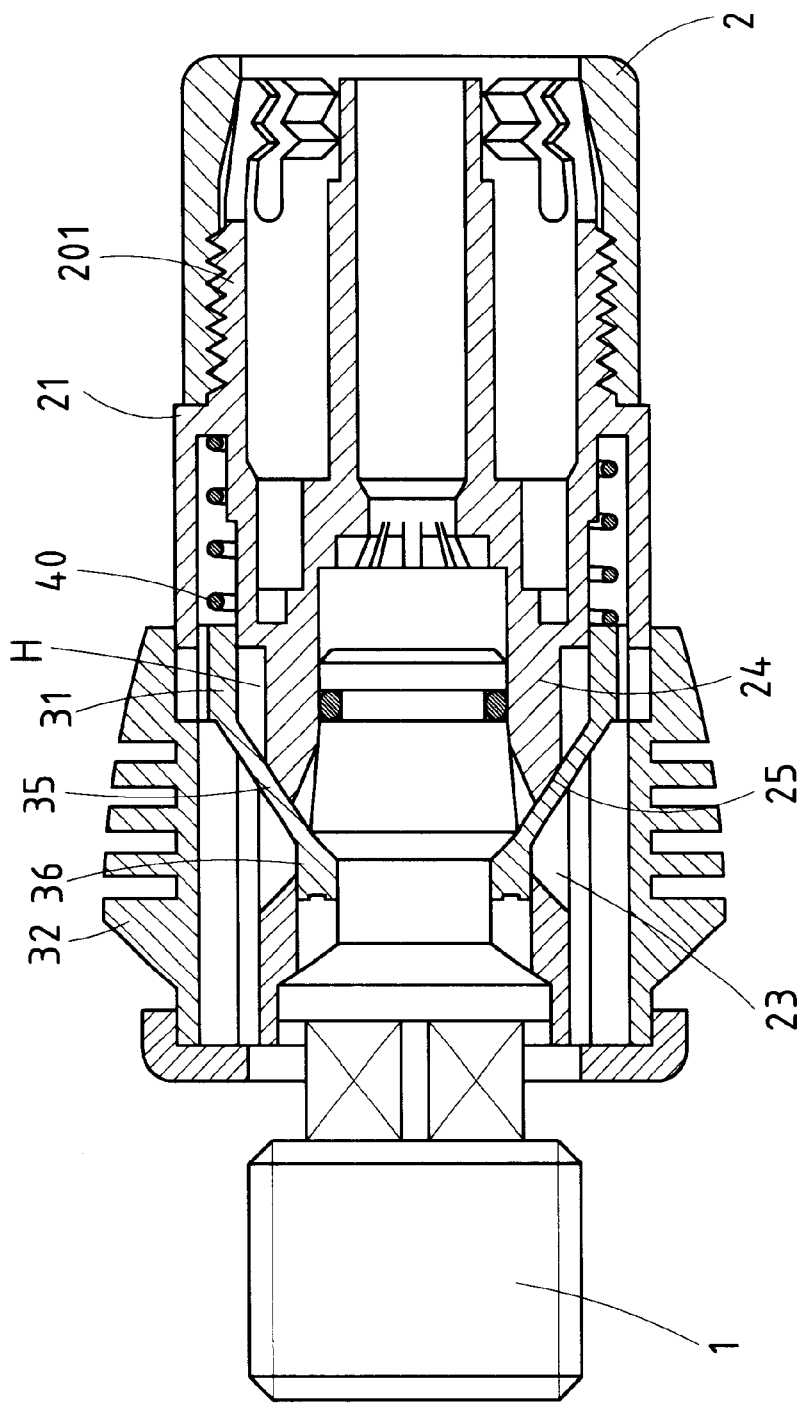
FIG. 3 shows a longitudinal sectional view of the first preferred embodiment of the present invention.
Figure 4:
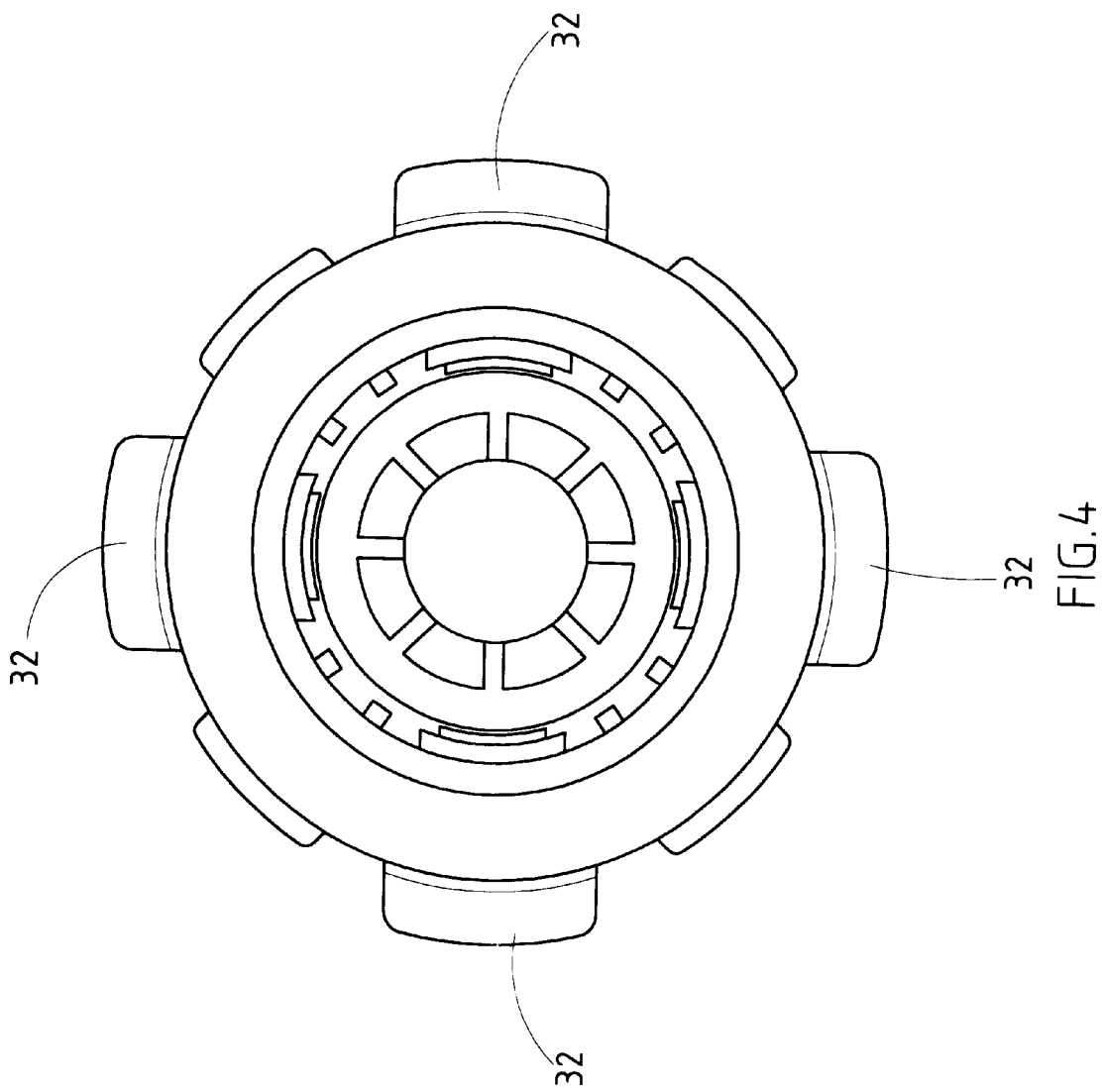
FIG. 4 shows a cross-sectional view of the first preferred embodiment of the present invention.
Figure 5:
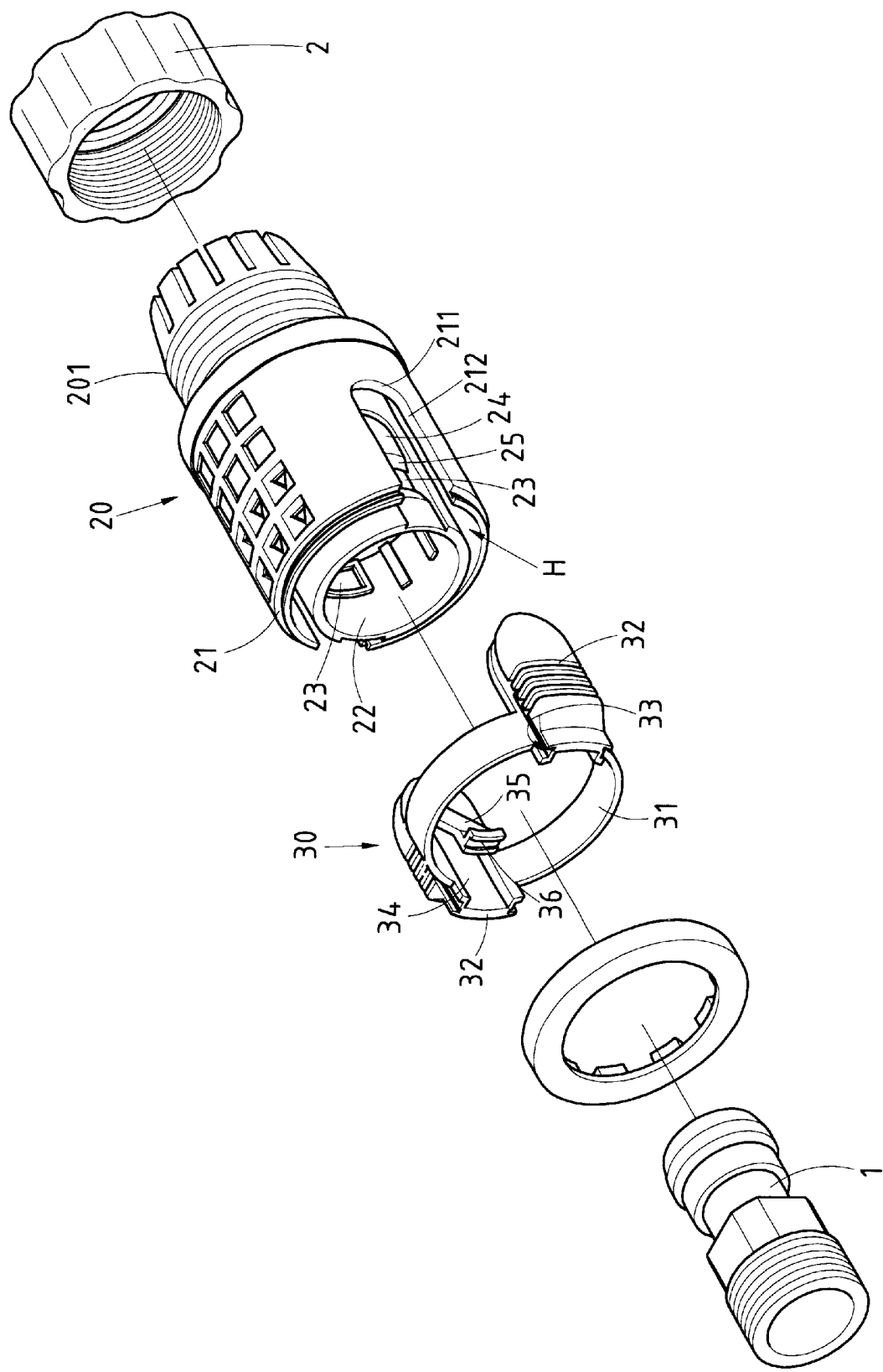
FIG. 5 shows an exploded view of a second preferred embodiment of the present invention.
Figure 6:
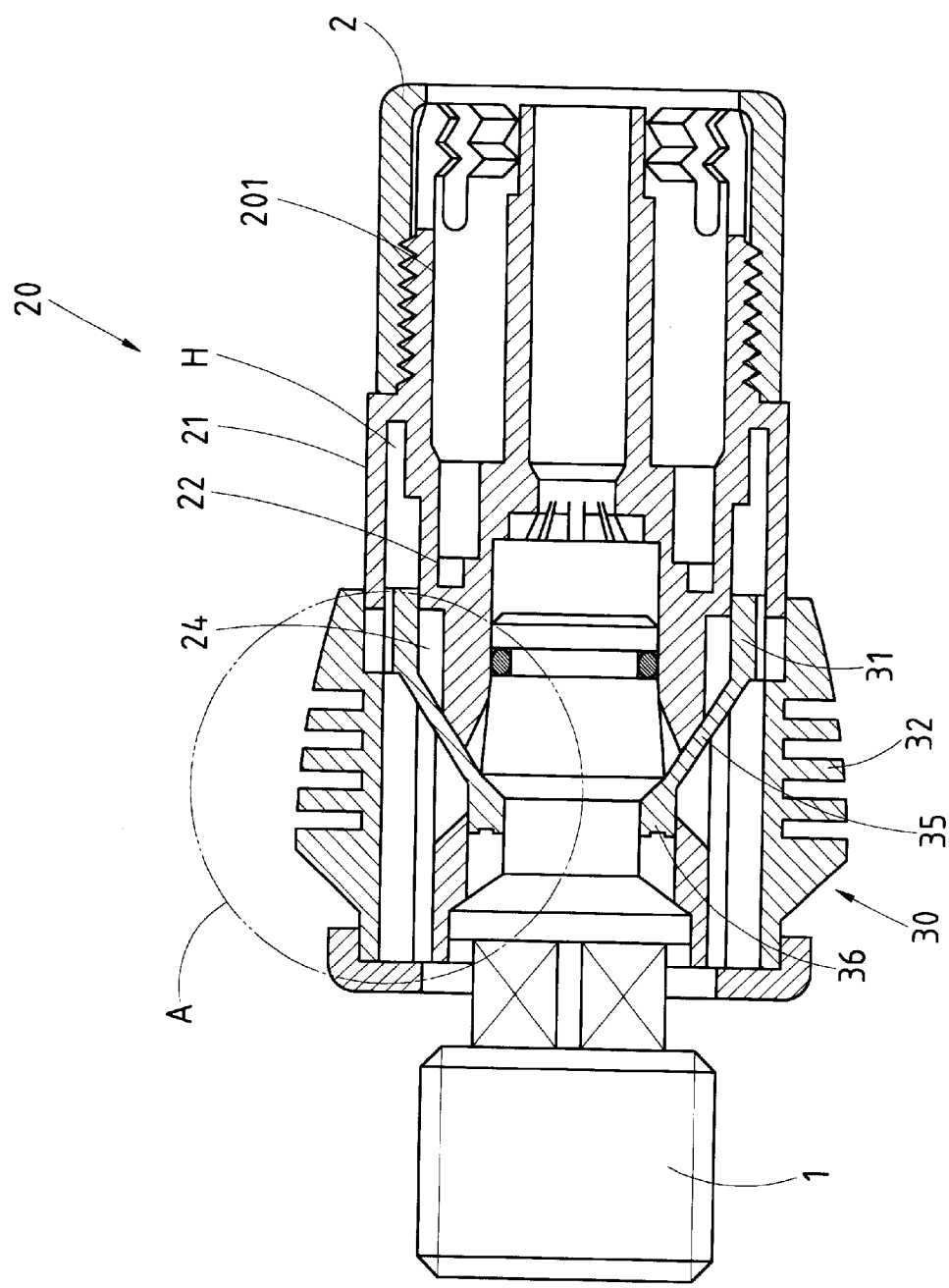
FIG. 6 shows a longitudinal sectional view of the second preferred embodiment of the present invention.
Figure 7:
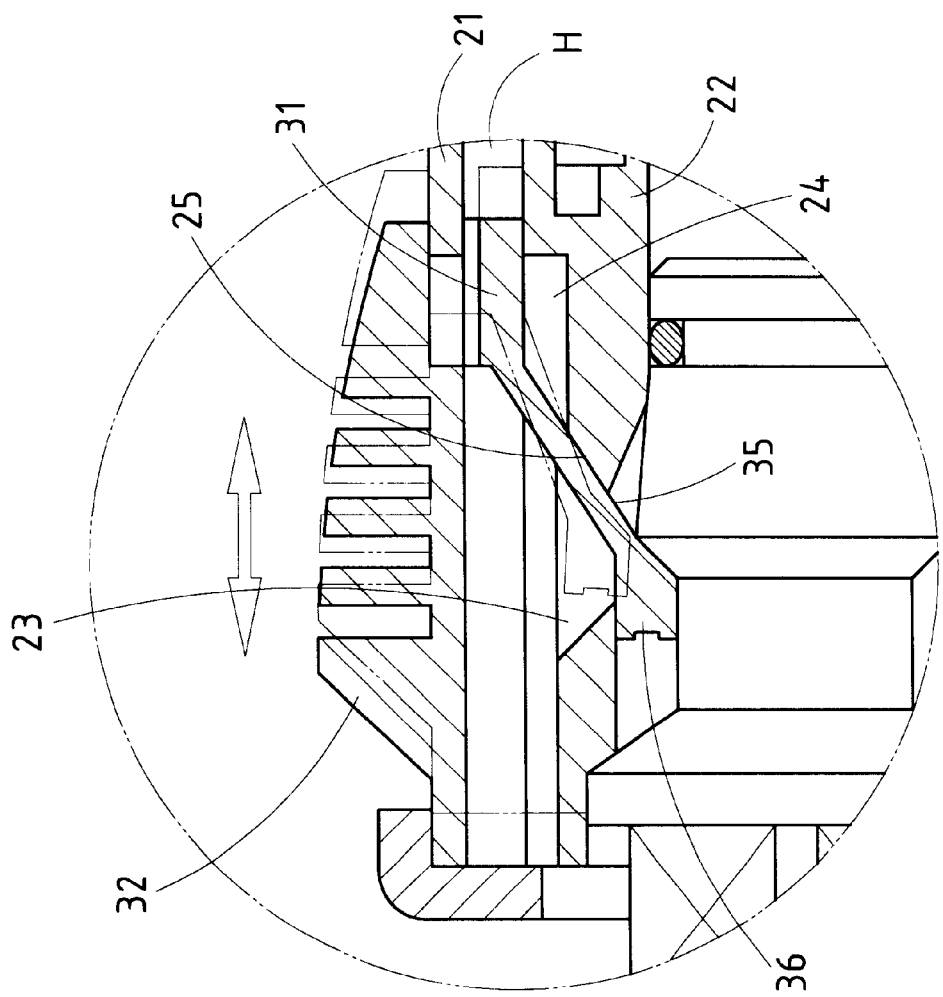
FIG. 7 shows an enlarged view of a portion indicated by a circle "A" as shown in FIG. 6.

As shown in FIGS. 2–7, a water pipe joint embodied in the present invention comprises a main body 20, a control sleeve 30, and an elastic element 40.

The main body 20 has an outer cylindrical body 21, an inner cylindrical body 22, and a gap "H" located between the outer cylindrical body 21 and the inner cylindrical body 22. The outer cylindrical body 21 is provided in the periphery with a plurality of slide slots 211, whereas the inner cylindrical body 22 is provided with a plurality of expansion holes 23, and a plurality of receiving slots 24 corresponding in location to the slide slots 211 of the outer cylindrical body 21. The receiving slots 24 and the expansion holes 23 are provided at the juncture with a guide bevel 25.

The control sleeve 30 has a connection ring 31 and a plurality of projections 32, with each having two track slots 33 corresponding in location to the slide slots 211 of the main body 20. The projections 32 are provided in the underside with an expansion slot 34 and a resilient piece 35 extending slantingly from the expansion slot 34 and having at the free end thereof a retaining block 36.

The elastic element 40 is received in the gap "H" between the outer cylindrical body 21 and the inner cylindrical body 22 such that one end of the elastic element 40 urges the control sleeve 30, and that other end of the elastic element 40 urges the main body 20, thereby enabling the control sleeve 30 and the main body 20 to slide smoothly. As a result, a water discharging connector 1 can be securely retained by the retaining blocks 36 of the control sleeve 30.

In combination, the control sleeve 30 is joined with the main body 20 in conjunction with the elastic element 40 such that the track slots 33 of the projections 32 are joined with the position confining edges 212 of the outer cylindrical body 21, such that the retaining blocks 36 of the control sleeve 30 can be displaced in the receiving slots 24 of the inner cylindrical body 22, and such that the retaining blocks 36 of the control sleeve 30 can be acted on by the elastic element 40 and the resilient pieces 35 of the control sleeve 30 to jut out of the expansion holes 23 of the main body 20 to retain the water discharging connector 1. The retaining blocks 36 of the control sleeve 30 can be retracted into the receiving slots 24 of the inner cylindrical body 22, so as to become disengaged with the water discharging connector 1.

In using the water pipe joint of the present invention, a water admitting connector 201 of the main body 20 is connected to a water pipe in conjunction with a fastening nut 2.

The present invention described above is to be regarded in all respects as being merely illustrative and not restrictive. Accordingly, the present invention may be embodied in other specific forms without deviating from the spirit thereof. The present invention is therefore to be limited only by the scope of the following claim.

I claim:

1. A water pipe joint comprising:
    a main body having an outer cylindrical body and an inner cylindrical body, said outer cylindrical body and said inner cylindrical body defining a gap therebetween, said outer cylindrical body having a plurality of slide slots formed in a periphery thereof, said inner cylindrical body having a plurality of expansion holes formed through a wall thereof, said inner cylindrical body having a plurality of receiving slots corresponding respectively in location to said plurality of slide slots of said outer cylindrical body, said main body having a plurality of guide bevels positioned at junctures of said plurality of receiving slots of said inner cylindrical body and respective expansion holes of said plurality of expansion holes of said inner cylindrical body;

a control sleeve having a connection ring and a plurality of projections, each of said plurality of projections having a pair of track slots slidably cooperative with respective slide slots of said plurality of slide slots on said outer cylindrical body, each of said plurality of projections having an expansion slot formed in an inner surface thereof and a resilient piece extending from said expansion slot, said resilient piece having a retaining block formed at a free end thereof; and an elastic element received in said gap of said main body said that one end of said elastic element exerts a resilient force against said control sleeve and an opposite end of said elastic element exerts a resilient force against said main body, said control sleeve being joined to said main body such that said pair of track slots of each of said plurality of projections are joined with a plurality of projections are joined with a plurality of position confining edges of said outer cylindrical body, the retaining blocks of said control sleeve being displaced in respective receiving slots of said plurality of receiving slots of said inner cylindrical body, the retaining blocks retained entirely interior of the expansion holes and being cooperative with said elastic element and the resilient pieces of said control sleeve so as to jut out of respective expansion holes of said plurality of expansion holes of said main body so as to retain a water discharging connector therein, the retaining blocks of said control sleeve being retractable into respective receiving slots of said inner cylindrical body so as to enable disengagement from said water discharging connector.

* * * * *